United States Patent [19]

Baxter et al.

[11] Patent Number: 4,581,676

[45] Date of Patent: Apr. 8, 1986

[54] ELECTRICAL CONTACT COATING FOR SILICON PRESSURE TRANSDUCERS

[75] Inventors: Ronald D. Baxter, Furlong; Paul M. Kroninger, Jr., Harleysville, both of Pa.

[73] Assignee: General Signal Corporation, Stamford, Conn.

[21] Appl. No.: 651,206

[22] Filed: Sep. 17, 1984

[51] Int. Cl.⁴ .......................... H01G 7/00; G01L 9/12
[52] U.S. Cl. ........................................ 361/283; 73/718
[58] Field of Search ........................... 361/283; 73/718

[56] References Cited

U.S. PATENT DOCUMENTS

| | | | |
|---|---|---|---|
| 3,557,621 | 1/1971 | Ferran | 73/718 |
| 4,168,518 | 9/1979 | Lee | 361/283 |
| 4,424,713 | 1/1984 | Kroninger et al. | 73/718 |
| 4,433,580 | 2/1984 | Tward | 361/283 X |
| 4,445,383 | 5/1984 | Binder et al. | 73/718 |

OTHER PUBLICATIONS

Academic Press 1983, Murarka Silicides for VLSI Applications, pp. 30-33, 56, 126, and 167-171.

*Primary Examiner*—Donald A. Griffin
*Attorney, Agent, or Firm*—Harold Huberfeld; William G. Miller, Jr.

[57] ABSTRACT

An electrostatically bonded capacitive pressure measuring transducer constructed with a silicon diaphragm member sandwitched between a top silicon support plate and a bottom silicon support plate each of which has a via hole extending therethrough, a thin layer of borosilicate glass interposed between the diaphragm and each of the support plates, a metallized deposit extending through the via holes and over a part of the surface of each of the glass layers opposite the diaphragm to form with the diaphragm two variable capacitors which will be electrically contacted by spring loaded plunger type contacts, and a layer of platinum silicide deposited on the top of the silicon diaphragm and the top of each of the silicon plates as an electrical contact coating providing a contact surface for the plunger type contacts.

2 Claims, 2 Drawing Figures

ELECTRICAL CONTACT COATING FOR SILICON PRESSURE TRANSDUCERS

BACKGROUND OF THE INVENTION

This invention relates to electrical contact coatings for silicon and particularly to electrostatically bondable coatings which will be useful in fabricating pressure transducers and which will provide a good electrical contact surface for the silicon of the transducers. Some pressure transducers are constructed by sandwitching an etched silicon diaphragm between silicon plates with a thin Pyrex glass layer separating the plates from the diaphragm so as to provide the necessary materials for electrostatic bonding of the plates to the diaphragm and for electrically isolating the plates from the diaphragm. This invention particularly relates to the provision of contact coatings for such pressure transducers and more particularly to contact coatings which must provide a contact surface for spring loaded plunger type contacts.

In U.S. patent application Ser. No. 594,585, entitled "ELECTRICAL FEEDTHROUGH MEANS FOR PRESSURE TRANSDUCER", filed by Paul B. Binder and Paul M. Kroninger, Jr. on Mar. 29, 1984, there is disclosed a means providing a bulkhead feedthrough using a spring loaded plunger type contacts to make electrical connection to a silicon pressure transducer of the structure described above. In the arrangement shown in that application, the areas on the silicon where electrical contact is made are shown as being coated with a thin film of metal, such as aluminum, for example. It has been found, however, that such coatings are not as durable as is desired. It is believed that contact by the spring loaded plunger causes the metal coating to wear off. This appears to be due to the scrubbing action of the contact on the surface as a result of vibration of the transmitter while it is in use. Also, since it is necessary to test the transmitters before final assembly and that testing quite naturally includes connection in a test circuit by the use of spring loaded contacts similar to those used in the pressure transducer assembly itself, the testing itself causes some wear on the metal coating of the contact area. Still further problems can arise from the thin metal coatings. For example, the coating may tend to disappear due to adverse conditions as the transducer is processed through the steps necessary in its construction. This disappearance may, for example, occur because the metal coating becomes the sacrificial electrode of an electrolytic pair. The adverse conditions which must be considered also include the heating of the transducer as is necessary in some of the steps of the process, such as the electrostatic bonding. In view of these requirements, there were set up the following criteria as being desirable for the coating of the contact areas of the silicon transducer:

1. Low electrical resistance
2. Abrasion resistance
3. Corrosion resistance
4. High temperature resistance
5. Electrostatically bondable to Pyrex 7740 glass.

It is known that platinum silicide provides a contact coating for silicon which meets the first four criteria set forth above. It is also known that electrostatic bonding of silicon and borosilicate glass has developed as the preferred method for bonding the elements of silicon transducers because of its firm bond and also due to the fact that it does not require any great increase in size of the final package as occurs when a glass-to-metal seal is made. Therefore, one of the necessary characteristics for the contact material is that it be electrostatically bondable, as indicated above. If it posseses this characteristic the coating can be laid down over the entire diaphragm and the entire surface of the silicon plates during manufacture of the transducer. This approach simplifies the manufacturing procedure, for masking is then not required, U.S. Pat. No. 3,397,278, issued to D. I. Pomerantz on Aug. 13, 1968 describes the electrostatic or anodic bonding procedure for several materials including silicon and borosilicate glass. It is an object of this invention to provide a contact coating for silicon which has resistance to abrasion, corrosion, and high temperature resistance as well as having a low electrical resistance and the ability to be electrostatically bondable with Pyrex 7740.

SUMMARY OF THE INVENTION

We have discovered that a contact coating of platinum silicide on silicon can be electrostatically bonded to borosilicate glass using the procedures set forth for other materials in U.S. Pat. No. 3,397,278. This coating is useful in electrostatically bonded capacitive pressure measuring transducers which have a silicon diaphragm member sandwitched between a top silicon support plate and a bottom silicon support plate with a thin layer of borosilicate glass interposed between the diaphragm and each of the support plates, and a metallized deposit extending through a via holes and over a part of the surface of each of the glass layers opposite the diaphragm to form with the diaphragm two variable capacitors which will be electrically contacted by spring loaded plunger type contacts. The electrical contact surface provided is a layer of a platinum silicide deposited on the top of the silicon diaphragm and the top of each of the silicon plates.

DESCRIPTION OF THE PREFERRED EMBODIMENT

Figure 1:
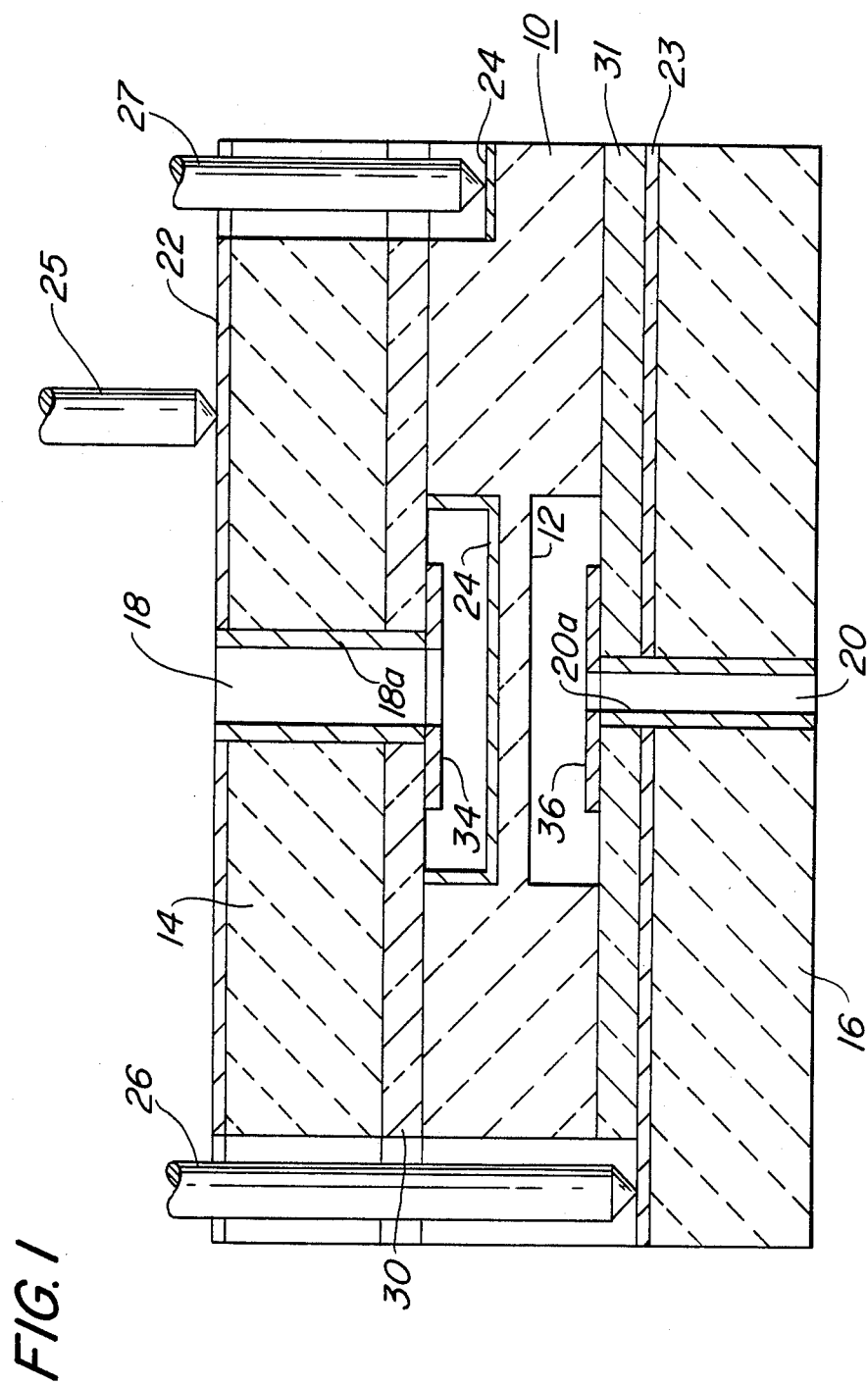
FIG. 1 is a cross section of a pressure transducer which uses this invention.

In FIG. 1 there is shown a cross section of a capacitive pressure transducer constructed using the present invention. This transducer uses a diaphragm 10 which is a single crystal of silicon which has been etched on both sides to form a circular recess on both sides and thereby form the thin deflecting portion 12 of the diaphragm. This diaphragm is sandwitched between two electrode support plates 14 and 16. The top support plate 14 and the bottom support plate 16 both have pressure communicating passages shown as via holes 18 and 20, respectively, for providing communication to the opposite sides of the deflecting portion of the diaphragm 10.

The top surfaces of the top support plate, the bottom support plate, and the recessed surface of the top of the diaphragm are all coated with a contact coating designed to provide good electrical contact with the elements forming the capacitor plates in the transducer particularly when the contacts are spring loaded plunger type contacts. In FIG. 1 the contact coatings are respectively shown as 22, 23, and 24 which are contacted by the respective plunger type contacts 25, 26, and 27. As has been mentioned these contacts are biased by springs (not shown) to contact with the contact coatings.

The diaphragm 10 is separated from the top support plate 14 and the bottom support plate 16 by thin glass layers 30 and 31. These glass layers are of borosilicate glass and more specifically Cornings Pyrex 7740, which has a temperature coefficient very close to that of silicon and is easily bondable by electrostatic bonding procedures as is desired for this type of application. Preferably the glass layers 30 and 31 are as thin as is possible for this application in order to make the transducer span and zero substantially insensitive to changes in temperature and hydrostatic pressure as is taught in U.S. patent application Ser. No. 594,588, filed Mar. 28, 1984.

The walls of the via holes 18 and 20 are coated by a thick film of conductive material, 18a and 20a, while the capacitor plates 34 and 36 are formed as a thin film metallization on the interior surface of the glass layers 30 and 31 so that these plates form with the deflecting portion 12 of the diaphragm 10 the two capacitors utilized in the differential pressure measurements for which this structure is designed.

Figure 2:
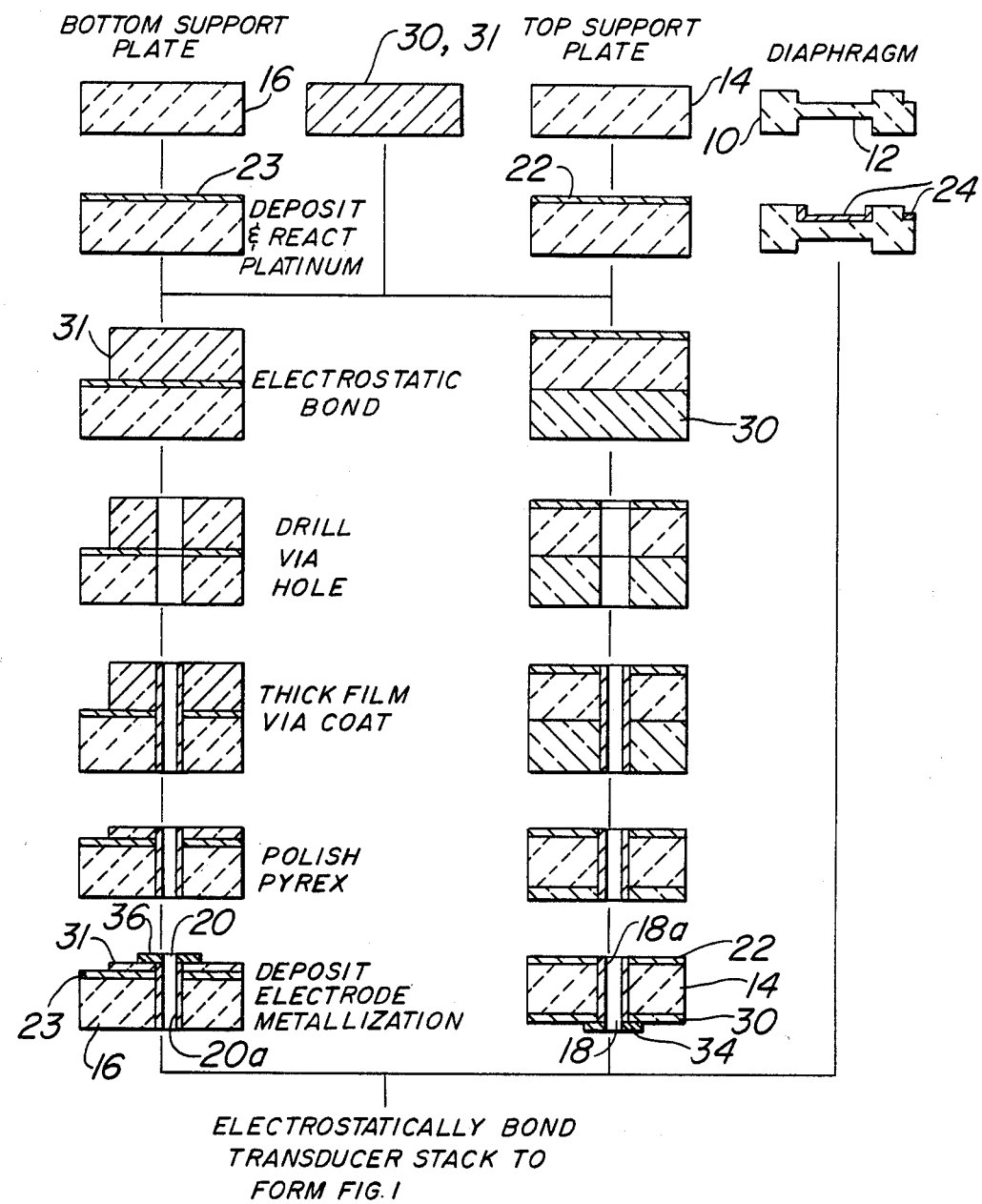
FIG. 2 is a flow diagram showing the various steps in the production of a transducer of the type shown in FIG. 1.

In FIG. 2 there is shown the various steps of the process for manufacturing the pressure tranducer of FIG. 1. To begin this process it is necessary to start off with a bottom silicon support plate 16, shown at the top left of FIG. 2; the two plates 30 and 31 of Pyrex 7740 (a borosilicate glass); a top silicon support plate 14; and the silicon diaphragm 10. The steps shown in FIG. 2 are the following:

1. Etch the silicon diaphragm on both sides so as to form two circular recesses which define the deflecting portion 12 of the diaphragm 10.
2. Deposit platinum on the top of the support plates and on the recessed surfaces on the top of the diaphragm and react the platinum with the silicon as set forth below:
   A. Prepare the silicon as follows:
      1. Clean the silicon with $H_2SO_4:H_2O$ (2:1) for 10 minutes.
      2. Strip the oxide formed by the cleaning, using 5-10% HF (Conc.) in deionized water, 1 minute.
      3. Rinse in deionized water, 10 minutes.
      4. Dry at 120° C. in air, 30 minutes.
      5. Load immediately in a deposition device.
   B. Deposite a film of platinum about 400 Å thick by sputtering, evaporation, or chemical vapor deposition.
   C. React the platinum coating with the silicon it is deposited on by subjecting the parts to a temperature of 600° C. for 30 minutes in a nitrogen atmosphere.
   D. Strip unreacted platinum with Aquaregia (3HCL: 1HNO$_3$) at 90° C., 10 minutes and then rinse with deionized water for 10 minutes.
3. Electrostatically bond (1000 volts, 500° C.) a Pyrex plate to the top of the bottom support plate and to the bottom of the top support plate.
4. Drill via holes in both of the bonded support plate-Pyrex plate structures.
5. Deposit thick conductive film on the periphery of the via holes.
6. Polish the Pyrex to the desired thickness on both support plates.
7. Deposit the desired electrode metallization on the Pryex layer of each support plate.
8. Electrostatically bond (250 volts, 500° C.) the transducer stack as required to form the structure of FIG. 1.

It will be recognized by those skilled in the art that the above steps may be modified somewhat with regard to voltages, times and temperatures and still provide results desired.

What is claimed is:

1. In an electrostatically bonded capacative pressure measuring transducer having a silicon diaphragm member sandwitched between a top silicon support plate and a bottom silicon support plate each of which has a via hole extending therethrough, a thin layer of borosilicate glass interposed between the diaphragm and each of the support plates, and a metallized deposit extending through the via holes and over a part of the surface of each of the glass layers opposite the diaphragm to form with the diaphragm two variable capacitors which will be electrically contacted by spring loaded plunger type contact, the improvement comprising:
   a layer of platinum silicide deposited on the top of the silicon diaphragm and the top of each of the silicon plates as an electrical contact coating providing a contact surface for said plunger type contacts.

2. A capacitive pressure measuring transducer formed as an electrostatically bonded stack which is contacted electrically by spring loaded plunger type contacts, said transducer comprising:
   a diaphragm member formed of a single crystal of silicon by etching into both sides of said diaphragm recesses defining the deflecting region of said diaphragm;
   a pair of silicon support plates on opposite sides of said diaphragm so that one forms a top plate and the other forms a bottom plate, said plate each having a pressure communicating passage extending therethrough;
   a platinum silicide coating deposited on the top of each of said plates and the top of said diaphragm;
   a thin layer of borosilicate glass interposed between the silicon top plate and the platinum silicide coating on said diaphragm and between the silicon diaphragm and the platinum silicide coating on said bottom plate; and
   a metallized region deposited in said communicating passages and extending over a part of the surface of each of said glass layers opposite the deflecting region of said diaphragm to form opposite said deflecting region separate capacitor plates which form with the common plate formed by said diaphragm two variable capacitors whose capacitances change in opposite sense with changes in the pressure being measured, external electrical contact with said diaphragm and said capacitor plates being made by contact with said platinum silicide coatings.

* * * * *